US012260399B2

(12) United States Patent
Cho et al.

(10) Patent No.: US 12,260,399 B2
(45) Date of Patent: Mar. 25, 2025

(54) AVATAR CARRIER GENERATING SYSTEM FOR METAVERSE AND METHOD THEREOF

(71) Applicants: Inventec (Pudong) Technology Corporation, Shanghai (CN); Inventec Corporation, Taipei (TW); Inventec (Beijing) Electronics Technology Co., LTD, Beijing (CN)

(72) Inventors: Tom-Hwar Cho, Taipei (TW); Li-Cheng Yeh, Taipei (TW); Chuan-Cheng Chiu, Taipei (TW)

(73) Assignees: Inventec (Pudong) Technology Corporation, Shanghai (CN); Inventec Corporation, Taipei (TW); Inventec (Beijing) Electronics, Technology Co., LTD, Beijing (CN)

( * ) Notice: Subject to any disclaimer, the term of this patent is extended or adjusted under 35 U.S.C. 154(b) by 316 days.

(21) Appl. No.: 17/945,718

(22) Filed: Sep. 15, 2022

(65) Prior Publication Data
US 2024/0070653 A1 Feb. 29, 2024

(30) Foreign Application Priority Data
Aug. 29, 2022 (CN) .......................... 202211048709.X

(51) Int. Cl.
*G06Q 20/00* (2012.01)
*G06Q 20/36* (2012.01)
*H04L 9/00* (2022.01)
(52) U.S. Cl.
CPC ........... *G06Q 20/3674* (2013.01); *H04L 9/50* (2022.05); *G06Q 2220/165* (2013.01)

(58) Field of Classification Search
None
See application file for complete search history.

(56) References Cited

U.S. PATENT DOCUMENTS 11,488,265 B1\* 11/2022 Jain ........................... H04L 9/32
2022/0384027 A1\* 12/2022 Kaleal, III ............... A61B 5/11
(Continued)

OTHER PUBLICATIONS

Xu et al., "A Full Dive Into Realizing the Edge-Enabled Metaverse: Visions, Enabling Technologies, and Challenges," in IEEE Communications Surveys & Tutorials, vol. 25, No. 1, pp. 656-700, Firstquarter 2023. (Year: 2023).\*

*Primary Examiner* — Amelia L Tapp
(74) *Attorney, Agent, or Firm* — David R. Stevens; Stevens Law Group

(57) ABSTRACT

An avatar carrier generating system for metaverse and method thereof are disclosed. Before a living body enters a metaverse, a sensing element senses the living body to generate a physiological feature, and after a real-name identity message is received, the real-name identity message and the physiological feature are converted into metadata compliant with a non-fungible token standard; the non-fungible token, which is owned by the living body, is generated on the blockchain based on the metadata. When the living body enters the metaverse, an avatar carrier for entering the metaverse is generated based on the metadata of the non-fungible token, and when the avatar carrier receives an identification request, the avatar carrier is permitted to provide at least one of the physiological feature and the real-name identity message, so as to achieve the effect of improving identifiability and authentication of the avatar carrier of the metaverse.

8 Claims, 4 Drawing Sheets

(56) References Cited

U.S. PATENT DOCUMENTS

2023/0009304 A1\* 1/2023 Jakobsson .......... G06Q 30/0241
2023/0316263 A1\* 10/2023 Eby ...................... H04L 9/3271

\* cited by examiner

AVATAR CARRIER GENERATING SYSTEM FOR METAVERSE AND METHOD THEREOF

CROSS-REFERENCE TO RELATED APPLICATION

This application claims the benefit of Chinese Application Serial No. 202211048709.X, filed Aug. 29, 2022, which is hereby incorporated herein by reference in its entirety.

BACKGROUND OF THE INVENTION

1. Field of the Invention

The present invention relates to an avatar carrier system and method thereof, and more particularly to an avatar carrier generating system for metaverse and method thereof.

2. Description of the Related Art

In recent years, with the popularization and vigorous development of metaverse technology, various applications based on metaverse have sprung up, and how to implement the real-name identity system in metaverse has become one of the problems that manufacturers are eager to solve.

In general, the conventional method for identification in metaverse is to confirm a user's account password, but it may fail to prevent fraudulent use when the user's account password is leaked; in addition, using passwords in different metaverses is inconvenient and easy to cause the problem of password leakage. Furthermore, using the password is difficult to check whether the avatar carrier in metaverse matches the real identity of the user. As a result, the avatar carrier has a problem of poor identifiability and authentication.

For this reason, some manufacturers have proposed a technical solution of setting unique accessory in the avatar carrier; for example, the avatar carrier is worn with a unique virtual object for identification and authentication, for example, the virtual object can be a virtual accessory or a virtual business card. However, this technical solution is not suitable for the avatar carrier that moves between different metaverses, because the above-mentioned virtual objects are unable to be used in different metaverses which the user enters through different channels, so it is also difficult to check whether the avatar carrier in a metaverse is the same as the real identity of the user. Therefore, the conventional technical solution does not effectively solve the problem of poor identifiability and authentication of the avatar carrier.

According to above-mentioned contents, what is needed is to develop an improved technical solution to solve the above-mentioned conventional problem of poor identifiability and authentication of an avatar carrier in a metaverse.

SUMMARY OF THE INVENTION

In order to achieve the objective, the present invention discloses an avatar carrier generating system for metaverse, wherein the avatar carrier generating system is applied in an environment where the metaverse and a blockchain are integrated, and the avatar carrier generating system includes at least one sensing element, a conversion module, a generation module and an avatar module. The at least one sensing element is configured to sense a living body before the living body enters the metaverse, so as to generate at least one physiological feature corresponding to the living body. The conversion module is connected to the sensing element, and configured to receive a real-name identity message, and convert the real-name identity message and the generated physiological feature into metadata compliant with a non-fungible token (NFT) standard. The generation module is connected to the conversion module configured to generate a non-fungible token on the blockchain based on the metadata, and permit the non-fungible token to be controlled by a cryptocurrency wallet owned by the living body. The avatar module is connected to the generation module, wherein when the living body enters the metaverse, the avatar module confirms that the cryptocurrency wallet is an owner of the non-fungible token, generates an avatar carrier for entering the metaverse based on the metadata of the non-fungible token, wherein when the avatar carrier receives an identification request, the avatar carrier is permitted to provide the at least one of the physiological feature and the real-name identity message contained in the metadata to perform an identity authentication.

In addition, the present invention discloses an avatar carrier generating method for metaverse, wherein the avatar carrier generating method is applied in an environment where a metaverse and a blockchain are integrated, and the avatar carrier generating method includes the steps of: before a living body enters the metaverse, sensing the living body to generate at least one physiological feature corresponding to the living body, by the at least one sensing element; receiving a real-name identity message, and converting the real-name identity message and the generated physiological feature into metadata compliant with a non-fungible token (NFT) standard; generating a non-fungible token on the blockchain based on the metadata, and permitting the non-fungible token to be controlled by a cryptocurrency wallet owned by the living body; when the living body enters the metaverse, first confirming that the cryptocurrency wallet is an owner of the non-fungible token, and then generating an avatar carrier for entering the metaverse based on the metadata of the non-fungible token, wherein when the avatar carrier receives an identification request, permitting the avatar carrier to provide at least one of the physiological feature and the real-name identity message contained in the metadata to perform an identity authentication.

In addition, the present invention discloses an avatar carrier generating method for metaverse, wherein the avatar carrier generating method is applied in environment where a metaverse and a blockchain are integrated, and the avatar carrier generating method includes the steps of: before a living body enters the metaverse, sensing the living body to generate at least one physiological feature corresponding to the living body, by the at least one sensing element; receiving a real-name identity message, and converting the real-name identity message and the generated physiological feature into metadata compliant with a non-fungible token (NFT) standard; generating a non-fungible token on the blockchain based on the metadata, and permitting the non-fungible token to be controlled by a cryptocurrency wallet owned by the living body; when the living body enters the metaverse, first confirming that the cryptocurrency wallet is an owner of the non-fungible token, and then generating an avatar carrier for entering the metaverse based on the metadata of the non-fungible token, wherein when the avatar carrier receives an identification request, permitting the avatar carrier to provide at least one of the physiological feature and the real-name identity message contained in the metadata to perform an identity authentication.

According to the above-mentioned system and method of the present invention, the difference between the present invention and the conventional technology is that, in the present invention, the sensing element senses the living body to generate the physiological feature before the living body enters the metaverse, and after the real-name identity message is received, the real-name identity message and the physiological feature are converted into metadata compliant with the non-fungible token standard; the non-fungible token, which is owned by the living body, is then generated on the blockchain based on the metadata, and when the living body enters the metaverse, the avatar carrier for entering the metaverse is generated based on the metadata of the non-fungible token, and when the avatar carrier receives an identification request, the avatar carrier is permitted to provide at least one of the physiological feature and the real-name identity message.

According to above-mentioned technical solution, the present invention is able to achieve the effect of improving identifiability and authentication of the avatar carrier of the metaverse.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
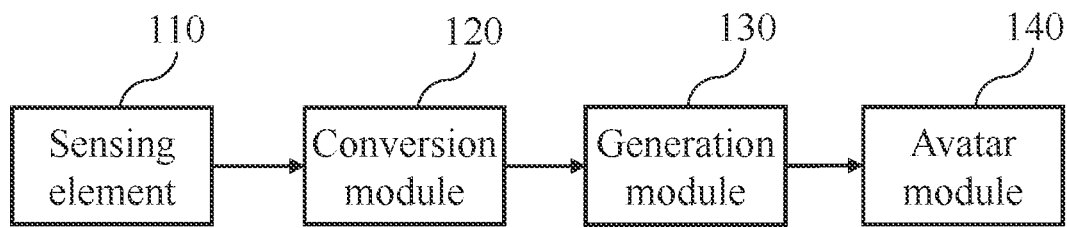
FIG. 1 is a system block diagram of an avatar carrier generating system for metaverse, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a system block diagram of an avatar carrier generating system for metaverse, according to the present invention. The avatar carrier generating system is applied in environment where a metaverse and a blockchain are integrated, and the avatar carrier generating system includes a sensing element 110, a conversion module 120, a generation module 130, and an avatar module 140. The sensing element 110 is configured to sense a living body to generate a physiological feature corresponding to the living body before the living body enters the metaverse. In actual implementation, the sensing element 110 can be disposed on a wearable device including at least one of a face sensing element, a voice sensing element and a retina sensing element; when the living body wears the wearable device, the sensing element 110 is driven to sense the living body to generate the physiological feature.

The conversion module 120 is connected to the sensing element 110, and configured to receive a real-name identity message, and convert both of the real-name identity message and the generated physiological feature into metadata compliant with a non-fungible token (NFT) standard. In actual implementation, in a process of converting the physiological feature into the metadata compliant with the non-fungible token (NFT) standard, the physiological feature and the real-name identity message are first encrypted by a key pre-stored in the cryptocurrency wallet, and after the encrypted message is generated, the encrypted message is converted into the metadata. When an avatar carrier receives an identification request, the metadata is generated as a response message by a manner the same as the above-mentioned manner; after an authentication-side host issuing the identification request confirms that a cryptocurrency wallet is an owner of a non-fungible token and that the received response message matches the metadata of the non-fungible token, it indicates that the avatar carrier passes the identity authentication.

The generation module 130 is connected to the conversion module 120 and configured to generate the non-fungible token based on the metadata in the blockchain, and the non-fungible token is permitted to be controlled by the cryptocurrency wallet owned by the living body. In actual implementation, there are many standards of generating the non-fungible token, such as ERC-721 or ERC-1155; each of the above-mentioned standards is based on metadata in JSON format, and the non-fungible token is generated in the blockchain through minting process. In addition, the non-fungible token is generated through a minting platform, the minting platform permits to mint or destroy the non-fungible token, and prohibits a transaction of the non-fungible token.

In other words, it indicates that the non-fungible token representing the real-name identity message can be permitted to mint and destroy only, but the transaction of the non-fungible token is not permitted. In general, the user can establish a new minting platform, or operate the existing minting platform, such as OpenSea, Rarible or Nifty Gateway.

The avatar module 140 is connected to the generation module 130, and when the living body is to enter the metaverse, the avatar module 140 first confirms that the cryptocurrency wallet is an owner of the non-fungible token, and then generates an avatar carrier for entering the metaverse based on the metadata of the non-fungible token. When the avatar carrier receives an identification request, the avatar carrier is permitted to provide the at least one of the physiological feature and the real-name identity message contained in the metadata to perform an identity authentication. When the avatar carrier enters the metaverse, moves or switches between different metaverses, the real-name identity message of the avatar carrier, the current time message, and the network address are recorded in real time, and the real-name identity message, the time message, and the network address are stored to a light node, which is a node that stores minimum amount of status data only and is configured to transmit or deliver the transaction message; when the light node needs to authenticate validity of the certain avatar carrier, particularly the light node issues a confirmation request to an adjacent full node, and the full node provides messages required for authentication after receiving the request.

It is to be particularly noted that, in actual implementation, the modules of the present invention can be implemented by various manners, including software, hardware or any combination thereof, for example, in an embodiment, the module can be implemented by software and hardware, or one of software and hardware. Furthermore, the present invention can be implemented fully or partly based on hardware, for example, one or more module of the system can be implemented by integrated circuit chip, system on chip (SOC), a complex programmable logic device (CPLD), or a field programmable gate array (FPGA). The concept of the present invention can be implemented by a system, a method and/or a computer program. The computer program can include computer-readable storage medium which records computer readable program instructions, and the processor can execute the computer readable program instructions to implement concepts of the present invention. The computer-readable storage medium can be a tangible apparatus for holding and storing the instructions executable of an instruction executing apparatus Computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-only-memory, a flash memory, an optical disk, a floppy disc or any appropriate combination thereof, but this exemplary list is not an exhaustive list. The computer-readable storage medium is not interpreted as the instantaneous signal such as radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C #, Perl, Ruby, and PHP, or regular procedural programming language such as C language or similar programming language. The computer readable program instruction can be fully or partially executed in a computer, or executed as independent software, or partially executed in the client-end computer and partially executed in a remote computer, or fully executed in a remote computer or a server.

Figure 2:
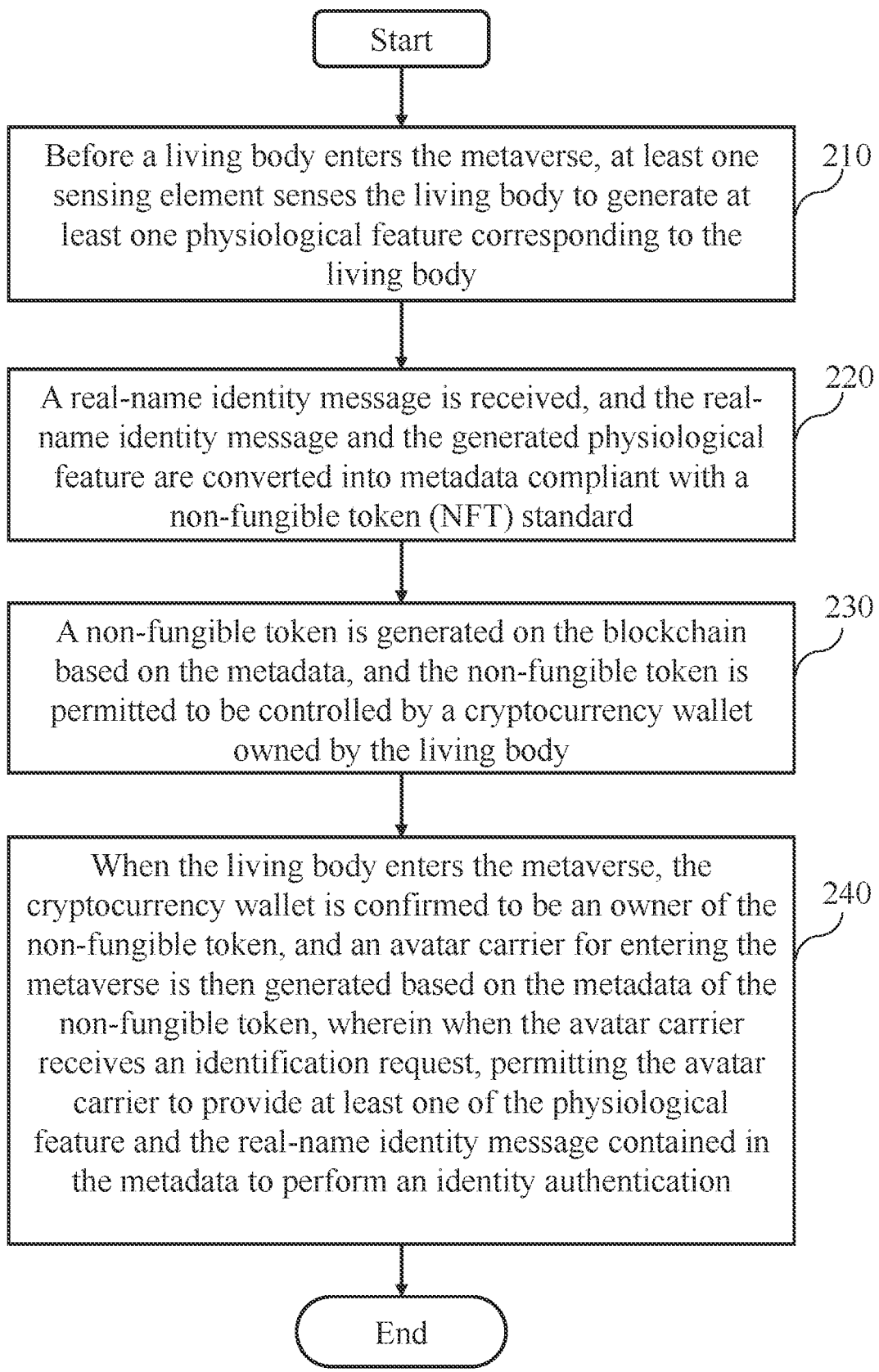
FIG. 2 is a flowchart of an avatar carrier generating method for metaverse, according to the present invention.

Please refer to FIG. 2, which is a flowchart of an avatar carrier generating method for metaverse, according to the present invention. The avatar carrier generating method is applied in environment where the metaverse and a blockchain are integrated. As shown in FIG. 2, the avatar carrier generating method includes the following steps. In a step 210, before a living body enters the metaverse, at least one sensing element senses the living body to generate at least one physiological feature corresponding to the living body. In a step 220, a real-name identity message is received, and the real-name identity message and the generated physiological feature are converted into metadata compliant with a non-fungible token (NFT) standard. In a step 230, a non-fungible token is generated on the blockchain based on the metadata, and the non-fungible token is permitted to be controlled by a cryptocurrency wallet owned by the living body. In a step 240, when the living body enters the metaverse, the cryptocurrency wallet is confirmed to be an owner of the non-fungible token, and an avatar carrier for entering the metaverse is then generated based on the metadata of the non-fungible token, wherein when the avatar carrier receives an identification request, permitting the avatar carrier to provide at least one of the physiological feature and the real-name identity message contained in the metadata to perform an identity authentication. In this way, before the living body enters the metaverse, the sensing element senses the living body to generate the physiological feature, and after the real-name identity message is received and both of the real-name identity message and the physiological feature are converted into the metadata of the non-fungible token (NFT) standard, the non-fungible token owned by the living body on the blockchain is then generated based on the metadata. When the living body is to enter the metaverse, the avatar carrier for entering the metaverse is generated based on the metadata of the non-fungible token; when the avatar carrier receives the identification request, the avatar carrier is permitted to provide at least one of the physiological feature and the real-name identity message.

Figure 3:
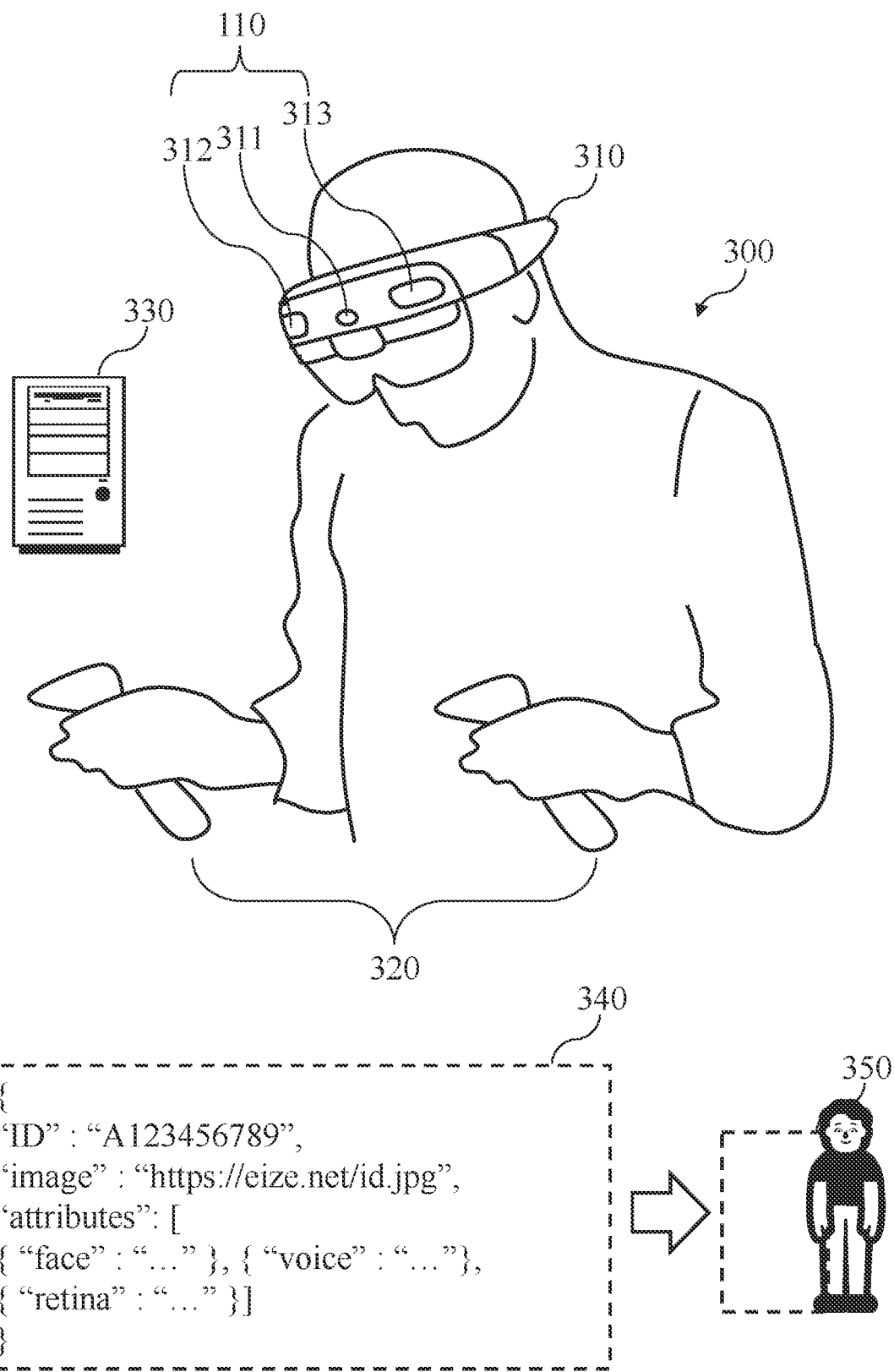
FIG. 3 is a schematic view of an application of generating an avatar carrier, according to the present invention.

The embodiment of the present invention will be described in the following paragraphs with reference to FIGS. 3 and 4. Please refer to FIG. 3, which is a schematic view of application of generating an avatar carrier, according to the present invention. Before a user (that is, a living body 300) enters the metaverse, the user can wear a wearable device 310 having the sensing element 110, which can be at least one of a face sensing element 311, a voice sensing element 312 and a retina sensing device 313, to sense the physiological feature corresponding to the user. The real-name identity message can be obtained through an input device 320, such as a keyboard, a card reader, a sensor or a scanner; a computer connected to the wearable device 310 and the input device 320 can then convert both of the real-name identity message (such as ID No.) and the physiological features (such as facial features, voiceprint features or retina features) into metadata 340 compliant with a non-fungible token (NFT) standard. Next, the computer 330 generates a unique non-fungible token based to the metadata 340 in the blockchain, and permits the non-fungible token to be controlled by a cryptocurrency wallet owned by the user; in other words, the cryptocurrency wallet has a private key for controlling the non-fungible token. In actual implementation, the cryptocurrency wallet can be a cool wallet or a hot wallet. When the user is to enter the metaverse, the computer 330 confirms whether the cryptocurrency wallet is the owner of the non-fungible token (that is, whether the cryptocurrency wallet has the corresponding private key), and if the cryptocurrency wallet is the owner of the non-fungible token, an avatar carrier (or called virtual avatar) 350 for entering the metaverse is generated based on the metadata of the non-fungible token. The avatar carrier 350 generated upon the above-mentioned basis has properties of the physiological feature and the real-name identity message, so that when the avatar carrier 350 receives the identification request in the metaverse, the avatar carrier is permitted to provide the at least one of the physiological feature and the real-name identity message contained in the metadata 340 to perform an identity authentication. In this way, although the avatar carrier 340 is a virtual object in the metaverse, the avatar carrier 340 has recognizable features which are unique and the same as the features of the real user, so that the identity authentication does not need the user to input an account and a password, and a more secure and quick authenticating scheme can be provided.

Figure 4:
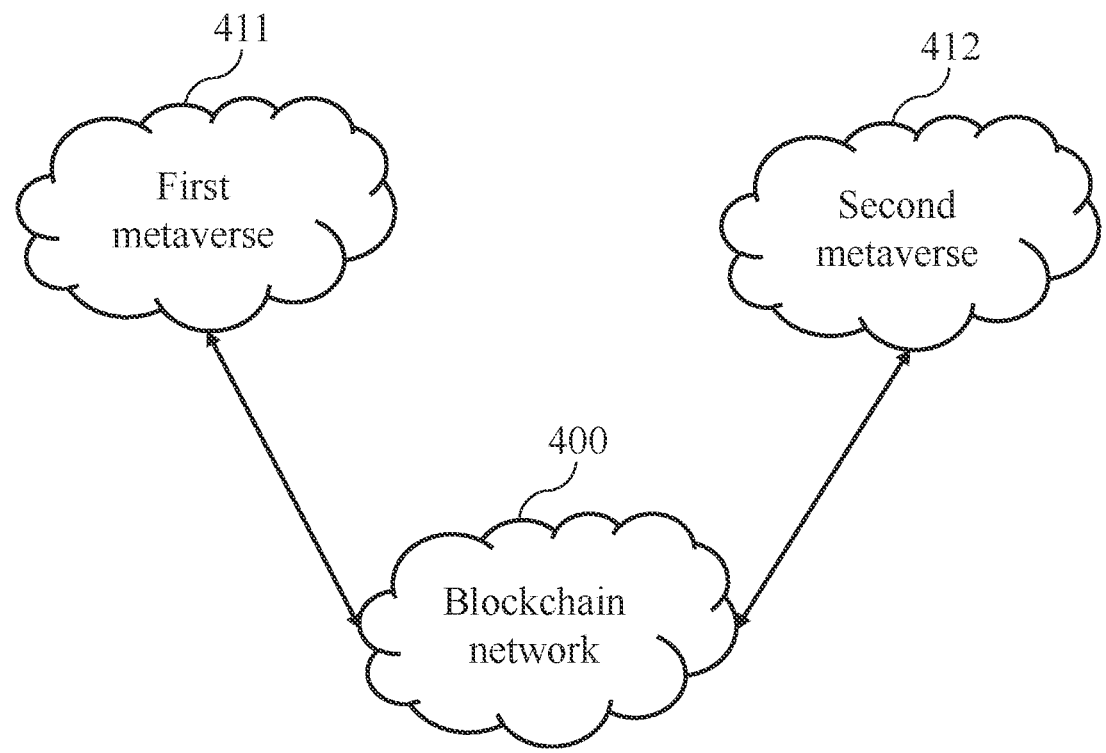
FIG. 4 is a schematic view of an application of using an avatar carrier to move between different metaverses, according to the present invention.

As shown in FIG. 4, which is a schematic view of an application of using an avatar carrier to move between different metaverses, according to the present invention. In actual implementation, there may be different metaverses (such as a first metaverse 411 and a second metaverse 412) in a real space; when the metaverses are integrated with the same blockchain network 400 (such as Ethereum), the above-mentioned technical solution of the present invention can be applied to generate a non-fungible token in the blockchain through the blockchain network 400, and the same avatar carriers can be directly generated based on the same non-fungible token in different metaverses, even the avatar carrier can directly move between the different metaverses. Movement of the avatar carrier between different metaverses is taken as an example for explanation, when the avatar carrier of the first metaverse moves to the second metaverse 412, the second metaverse generates the avatar carrier of the second metaverse based on the non-fungible token in the blockchain of any of node hosts in the blockchain network 400. In addition, when the avatar carrier moves to another metaverse, the real-name identity message, the current time message and the network address of the avatar carrier can be recorded in real time and stored to the light node through the metadata of the non-fungible token corresponding to the avatar carrier. The light node means the node that only stores the minimum amount of status data for transmitting or delivering the transaction message. When the light node needs to authenticate validity of certain avatar carrier, particularly the light node issues a confirmation request to an adjacent full node, and the full node provides the messages required for authentication after receiving the request.

According to above-mentioned contents, the difference between the present invention and the conventional technology is that, in the present invention, the sensing element senses the living body to generate the physiological feature before the living body enters the metaverse, and after the real-name identity message is received, the real-name identity message and the physiological feature are converted into metadata compliant with the non-fungible token standard; the non-fungible token, which is owned by the living body, is then generated on the blockchain based on the metadata, and when the living body enters the metaverse, the avatar carrier for entering the metaverse is generated based on the metadata of the non-fungible token, and when the avatar carrier receives an identification request, the avatar carrier is permitted to provide at least one of the physiological feature and the real-name identity message. According to above-mentioned technical solution, the present invention is able to solve the conventional technical problem, so as to achieve the effect of improving identifiability and authentication of the avatar carrier of the metaverse.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An avatar carrier generating system for a metaverse, wherein the avatar carrier generating system is applied in an environment where the metaverse and a blockchain are integrated, and the avatar carrier generating system comprises:

at least one sensing element configured to sense a living body before the living body enters the metaverse, so as to generate at least one physiological feature corresponding to the living body;

a conversion module, connected to the sensing element, and configured to receive a real-name identity message, and convert the real-name identity message and the generated physiological feature into metadata compliant with a non-fungible token (NFT) standard;

a generation module, connected to the conversion module, and configured to generate a non-fungible token on the blockchain based on the metadata, and permit the non-fungible token to be controlled by a cryptocurrency wallet owned by the living body; and an avatar module, connected to the generation module, wherein when the living body enters the metaverse, the avatar module confirms that the cryptocurrency wallet is an owner of the non-fungible token, generates an avatar carrier for entering the metaverse based on the metadata of the non-fungible token, wherein when the avatar carrier receives an identification request, the avatar carrier is permitted to provide the at least one of the physiological feature and the real-name identity message contained in the metadata to perform an identity authentication, and wherein before the avatar carrier enters the metaverse or moves between different metaverses, the real-name identity message, a current time message and a network address of the avatar carrier are recorded in real time, and the real-name identity message, the time message, and the network address are stored in a light node.

2. The avatar carrier generating system for a metaverse according to claim 1, wherein the sensing element is disposed on a wearable device comprising at least one of a face sensing element, a voice sensing element and a retina sensing element, wherein when the living body wears the wearable device, the sensing element is driven to sense the living body to generate the physiological feature.

3. The avatar carrier generating system for a metaverse according to claim 1, wherein in order to convert the physiological feature into the metadata compliant with the non-fungible token (NFT) standard, the conversion module encrypts the physiological feature and the real-name identity message with a key pre-stored in the cryptocurrency wallet, and after the encrypted message is generated, the encrypted message is converted into the metadata, wherein when the avatar carrier receives the identification request, the metadata is generated as a response message by the same manner, and after an authentication-side host issuing the identification request confirms that the cryptocurrency wallet is the owner of the non-fungible token and the received response message matches the metadata of the non-fungible token, the identity authentication is passed.

4. The avatar carrier generating system for a metaverse according to claim 1, wherein the non-fungible token is generated through a minting platform, and the minting platform itself has the capability to mint or destroy the non-fungible token, and to prohibit one or more transactions of the non-fungible token.

5. An avatar carrier generating method for a metaverse, wherein the avatar carrier generating method is applied in an environment where a metaverse and a blockchain are integrated, and the avatar carrier generating method comprises:
   before a living body enters the metaverse, sensing the living body to generate at least one physiological feature corresponding to the living body, by the at least one sensing element;
   receiving a real-name identity message, and converting the real-name identity message and the generated physiological feature into metadata compliant with a non-fungible token (NFT) standard;
   generating a non-fungible token on the blockchain based on the metadata, and permitting the non-fungible token to be controlled by a cryptocurrency wallet owned by the living body;
   when the living body enters the metaverse, first confirming that the cryptocurrency wallet is an owner of the non-fungible token, and then generating an avatar carrier for entering the metaverse based on the metadata of the non-fungible token, wherein when the avatar carrier receives an identification request, permitting the avatar carrier to provide at least one of the physiological feature and the real-name identity message contained in the metadata to perform an identity authentication;
   when the avatar carrier enters the metaverse or moves between different metaverses, recording the real-name identity message, a current time message and a network address of the avatar carrier in real time; and
   storing the real-name identity message, the time message, and the network address to a light node.

6. The avatar carrier generating method for a metaverse according to claim 5, wherein the sensing element is disposed on a wearable device comprising at least one of a face sensing element, a voice sensing element and a retina sensing device, wherein when the living body wears the wearable device, the sensing element is driven to sense the living body to generate the physiological feature.

7. The avatar carrier generating method for a metaverse according to claim 5, wherein the step of converting the physiological feature into the metadata compliant with the non-fungible token (NFT) standard comprises:
   encrypting the physiological feature and the real-name identity message with a key pre-stored in the cryptocurrency wallet; and
   after the encrypted message is generated, converting the encrypted message into the metadata;
   wherein the avatar carrier generating method for metaverse further comprises:
   when the avatar carrier receives the identification request, generating the metadata as a response message by performing the encrypting and the converting;
   wherein after an authentication-side host issuing the identification request confirms that the cryptocurrency wallet is the owner of the non-fungible token and the received matches the metadata of the non-fungible token, the identity authentication is passed.

8. The avatar carrier generating method for a metaverse according to claim 5, wherein the non-fungible token is generated through the minting platform, and the minting platform is permitted to mint or destroy the non-fungible token, and prohibit one or more transactions of the non-fungible token.

* * * * *